United States Patent
Vann et al.

(10) Patent No.: US 11,431,829 B2
(45) Date of Patent: Aug. 30, 2022

(54) MULTI-TIERED PACKET PROCESSING

(71) Applicant: Parsons Corporation, Centreville, VA (US)

(72) Inventors: Timothy Lewis Vann, Durham, NC (US); Christopher James DeBruin, Raleigh, NC (US); Matthew James Hodge, Centreville, VA (US); Kenneth Michael Helbling, Holly Springs, NC (US); Daniel Lynn Schweitzer, Durham, NC (US)

(73) Assignee: PARSONS CORPORATION, Centreville, VA (US)

( * ) Notice: Subject to any disclaimer, the term of this patent is extended or adjusted under 35 U.S.C. 154(b) by 175 days.

(21) Appl. No.: 16/811,468

(22) Filed: Mar. 6, 2020

(65) Prior Publication Data

US 2020/0287996 A1    Sep. 10, 2020

Related U.S. Application Data

(60) Provisional application No. 62/866,920, filed on Jun. 26, 2019, provisional application No. 62/814,502, filed on Mar. 6, 2019.

(51) Int. Cl.
*H04L 69/22* (2022.01)
*H04L 69/16* (2022.01)
(Continued)

(52) U.S. Cl.
CPC .......... *H04L 69/22* (2013.01); *H04L 12/4633* (2013.01); *H04L 69/16* (2013.01); *H04L 45/50* (2013.01)

(58) Field of Classification Search
CPC ..... H04L 69/22; H04L 12/4633; H04L 69/16; H04L 45/50; H04L 12/4645;
(Continued)

(56) References Cited

U.S. PATENT DOCUMENTS

| 8,260,801 B2 | 9/2012 | Feng et al. |
| 9,137,165 B2 | 9/2015 | Anand et al. |

(Continued)

*Primary Examiner* — Kwang B Yao
*Assistant Examiner* — Syed M Bokhari
(74) *Attorney, Agent, or Firm* — Martensen IP; Michael C. Martensen

(57) ABSTRACT

A system adaptably directs packet flows to packet processing elements based on OSI layer characteristics and, when necessary, inspection of data payloads. Characteristics of parsed data flows are identified. A comparison ensues. Upon recognition of a match, the entirety of the packet flow is directed to a linked packet processing element. When a match does not occur, the packet flow is directed to a second analysis tier whereby data payloads of the flow are examined. Characteristics from the data payload analysis are compared to entries in a database. Upon a match being recognized the matching packet flow is directed to the packet processing element. Features of packet flow having undergone data payload analysis are captured and used to update the database of prior associations so that any subsequent receipt of similar packet flows will be forwarded to the linked packet processing element without having to conduct a data payload analysis.

32 Claims, 6 Drawing Sheets

(51) Int. Cl.
*H04L 12/46* (2006.01)
*H04L 45/50* (2022.01)

(58) Field of Classification Search
CPC . H04L 43/026; H04L 43/028; H04L 45/7453; H04L 47/2483; H04L 47/32; H04L 63/1408; H04L 67/2814
USPC ........................................ 370/474, 477, 392
See application file for complete search history.

(56) References Cited

U.S. PATENT DOCUMENTS

| | | | |
|---|---|---|---|
| 9,246,801 B1* | 1/2016 | Kompella | H04L 45/50 |
| 9,621,642 B2 | 4/2017 | Ganesh et al. | |
| 9,825,862 B2 | 11/2017 | Bosshart | |
| 9,826,071 B2 | 11/2017 | Bosshart | |
| 9,838,276 B2 | 12/2017 | Pettit et al. | |
| 9,973,400 B2 | 5/2018 | Su et al. | |
| 10,033,696 B1 | 7/2018 | Burns et al. | |
| 10,057,387 B2 | 8/2018 | Chen et al. | |
| 10,158,573 B1 | 12/2018 | Lee et al. | |
| 10,200,251 B2 | 2/2019 | Martin et al. | |
| 10,212,089 B1 | 2/2019 | Narayanan | |
| 10,225,381 B1 | 3/2019 | Bosshart | |
| 10,241,893 B2 | 3/2019 | Barsness et al. | |
| 10,320,681 B2 | 6/2019 | Hira et al. | |
| 10,320,683 B2 | 6/2019 | Pfister et al. | |
| 10,338,989 B2 | 7/2019 | Barsness et al. | |
| 10,341,126 B2 | 7/2019 | Stammers et al. | |
| 10,341,206 B1 | 7/2019 | Hammerle et al. | |
| 10,367,749 B2 | 7/2019 | Williams, Jr. et al. | |
| 10,375,137 B2 | 8/2019 | Cook et al. | |
| 10,404,564 B2 | 9/2019 | Rai et al. | |
| 10,425,313 B2 | 9/2019 | Koster et al. | |
| 10,432,527 B1 | 10/2019 | Bosshart | |
| 10,454,790 B2 | 10/2019 | Goldfarb et al. | |
| 10,498,658 B2 | 12/2019 | Murgia | |
| 10,511,534 B2 | 12/2019 | Pfister et al. | |
| 10,530,694 B1 | 1/2020 | Lee et al. | |
| 2003/0177252 A1* | 9/2003 | Krichevski | H04L 69/18 709/230 |
| 2007/0058633 A1* | 3/2007 | Chen | H04L 69/22 370/392 |
| 2013/0232137 A1* | 9/2013 | Knott | H04L 63/1416 707/722 |
| 2014/0211813 A1* | 7/2014 | Gochi Garcia | H04L 67/02 370/477 |
| 2014/0369204 A1 | 12/2014 | Anand et al. | |
| 2014/0372567 A1 | 12/2014 | Ganesh et al. | |
| 2014/0372616 A1 | 12/2014 | Arisoylu et al. | |
| 2016/0328159 A1 | 11/2016 | Coddington et al. | |
| 2017/0063690 A1 | 3/2017 | Bosshart | |
| 2017/0064047 A1 | 3/2017 | Bosshart | |
| 2017/0324713 A1 | 11/2017 | Kantecki et al. | |
| 2018/0004435 A1 | 1/2018 | Coddington et al. | |
| 2018/0227229 A1 | 8/2018 | Lopez | |
| 2018/0248781 A1 | 8/2018 | Barsness et al. | |
| 2019/0012278 A1 | 1/2019 | Sindhu et al. | |
| 2019/0013965 A1 | 1/2019 | Sindhu et al. | |
| 2019/0324935 A1 | 10/2019 | Coddington et al. | |
| 2019/0324936 A1 | 10/2019 | Coddington et al. | |
| 2019/0373506 A1* | 12/2019 | Harari | H04L 47/125 |
| 2021/0160350 A1* | 5/2021 | Volpe | H04L 45/7453 |

* cited by examiner

MULTI-TIERED PACKET PROCESSING

RELATED APPLICATION

The present application relates to and claims the benefit of priority to U.S. Provisional Patent Application Nos. 62/814,502 and 62/866,920 filed 6 Mar. 2019 and 26 Jun. 2019, respectively, which are hereby incorporated by reference in their entirety for all purposes as if fully set forth herein.

BACKGROUND OF THE INVENTION

Field of the Invention

Embodiments of the present invention relate, in general, to packet flow analysis, inspection and load balancing and more particularly to multi-tiered packet flow management.

Relevant Background

It is estimated that by 2023 there will be 5.3 billion Internet users, representing a 51% increase in network traffic since 2018. The explosion of applications and services from various service providers coupled with the development of economical and easily available small and smart computing devices has resulted in this exponential increase in network traffic. And the growth is expected to continue. As traffic grows there can be interruption or delay in flow of critical or strategically important traffic at the cost of non-essential or non-critical traffic. For example, downloading or streaming of media content could occupy most of the available bandwidth whereby no bandwidth is left for essential or available network bandwidth is reduced by spam traffic and/or traffic is associated with malware. To resolve these conflicts, networks routinely screen network traffic through firewalls and similar applications to enforce policies and rules to monitor and filter traffic flow. Though helpful, these systems can still be overwhelmed.

As traffic increases the quality of essential services may suffer. Though individuals generally complain when a call drops, a video takes too much time to open, or a website does not open instantly, it is generally the office/business/enterprises that is most impacted by the degradation in traffic flow. Important information may be delayed or dropped because of traffic congestion and such types of delay/interruption may not be acceptable. Many ways are being explored and adopted by service providers to improve the quality of service. Some of these methods include increase in bandwidth, use of dedicated lease lines, and establishing of local area networks (LANs)/Virtual Private Networks (VPNs). Though initially successful, these systems too can be overwhelmed by the increasing traffic and as innovators develop new and diverse applications for providing a variety of services to subscribers, quality of, or even denial of, service is likely to increase.

Firewall devices are typically utilized to screen and filter network traffic and are generally based on the organization's security policies. High-end firewalls also have the ability to dynamically load balance and generally performs the flow-based forwarding by caching or otherwise storing flow state of given communication session between two devices. In such a method data packets are stored and analyzed and then forwarded based on analyzed data. However, analysis of the complete data frame can introduce delays in the network, which may not be desirable or acceptable for many critical applications.

Packet inspection techniques are used in a wide variety of applications. For example, in some applications, communication packets are analyzed in an attempt to detect communication traffic of interest. Some data security systems inspect packets in order to detect information that may leak from an organizational network. Some firewalls and intrusion detection systems inspect packets in order to identify illegitimate intrusion attempts or malicious traffic. As network traffic increases, analyzing packet data and providing each application with packets of interest becomes delayed, degrading the inspection applications ability to provide timely results. A need exists to quickly direct packet flows to select applications using packet flow header information while retaining the ability to conduct data analysis when necessary and thereafter modify the destination of a packet flow based on header information consistent with the data analysis. These and other deficiencies of the prior art are addressed by one or more embodiments of the present invention.

Additional advantages and novel features of this invention shall be set forth in part in the description that follows, and in part will become apparent to those skilled in the art upon examination of the following specification or may be learned by the practice of the invention. The advantages of the invention may be realized and attained by means of the instrumentalities, combinations, compositions, and methods particularly pointed out in the appended claims.

SUMMARY OF THE INVENTION

A multi-tiered packet processing system and associated methodology adaptably directs packet flows to select packet processing elements based on OSI layer 2-4 characteristics and, when necessary, inspection of data payloads. The present invention parses data flows thereby identifying a data flow's OSI layer 2-4 characteristics. A comparison of the identified OSI layer 2-4 to a database of OSI layer 2-4 associations ensues. Upon a match being recognized the entirety of the matching packet flow is immediately directed to the packet processing element linked to that OSI layer 2-4 association. When a match of a packet flow's observable characteristics does not occur, the packet flow is thereafter directed to a second analysis tier whereby data payloads of the flow are examined using keyword, expression extraction, semantic analysis and similar techniques. Characteristics from the data payload analysis are compared to entries in a packet analysis database. Upon a match being recognized the matching packet flow is thereafter directed to the packet processing element linked to that packet analysis entry. OSI layer 2-4 features of packet flow having undergone data payload analysis are captured and used to update the database of OSI layer 2-4 associations so that any subsequent receipt of similar packet flows will be immediately forwarded to the linked packet processing element without having to conduct a data payload analysis.

A multi-tiered method for packet flow processing, according to one embodiment of the present invention begins with receiving, by a parsing module, one or more encapsulated packet flows at a first analysis tier. The parsing module parses each of the one or more encapsulated packet flows gaining access to an innermost network frame of each parsed packet flow and thereafter extracts Open Systems Interconnection (OSI) layer 2-4 metadata. The OSI layer 2-4 metadata is compared to stored OSI layer 2-4 associations. Responsive to identifying, by a packet processor, a OSI layer 2-4 match between a stored OSI layer 2-4 association, gained initially from one or more packet processing elements, and the OSI layer 2-4 metadata of a parsed packet flow, the invention directs the parsed packet flow to a packet processing element according to the stored OSI layer 2-4 association.

Responsive to the stored OSI layer 2-4 association directing further packet analysis, the above process continues by delivering the parsed packet flow to one or more packet inspection engines of a second analysis tier. When one of the one or more packet inspection engines identifies an analysis match between a stored packet analysis association, gained initially from the one or more packet processing elements, and packet analysis results of the parsed packet flow gained by the one or more packet inspection engines, the parsed packet flow is directed according to information contained within the stored packet analysis association.

Additional features of the methodology described above can include, in other embodiments of the present invention, that each of the one or more packet processing elements updates the stored OSI layer 2-4 association based on received parsed packet flows. In addition, the stored OSI layer 2-4 association includes instructions directing the parsed packet flow for delivery to one or more packet processing elements. An additional feature of the present invention is that the stored OSI layer 2-4 association can include instructions directing the parsed packet flow be discarded and/or instructions directing the parsed packet flow to be delivered to the second analysis tier for further processing.

Another feature of the present invention is that the second analysis tier updates the stored OSI layer 2-4 associations based on packet analysis, and, responsive to failing to identify an OSI layer 2-4 match between stored OSI layer 2-4 association and the OSI layer 2-4, metadata of the parsed packet flow the present invention can be configured to output to the first analysis tier to the second analysis tier, or discard the parsed packet flow.

An offset to the innermost network frame of the parsed packet flow is, in yet another embodiment of the present invention, passed to the second analysis tier from the first analysis tier. And as with the first analysis tier, the stored packet analysis association of the second analysis tier includes instructions for directing the parsed packet flow be delivered to one or more packet processing elements. The stored packet analysis association of the second analysis tier can also include instructions directing the parsed packet flow be discarded.

Another feature of multi-tiered method for packet flow processing of the present invention includes that the second analysis tier updates stored OSI layer 2-4 associations of the first analysis tier based on analysis matches by the second analysis tier, thereby directing future parsed packet flows having OSI layer 2-4 metadata similar to OSI layer 2-4 metadata of analysis matches by the second analysis tier to the one or more packet processing elements by the first analysis tier rather than by the second analysis tier. Responsive to failing to identify an analysis match between stored packet analysis associations and the packet analysis results of the parsed packet flow, the invention can be configured to discard the parsed packet flow.

In yet another embodiment of the present invention, the packet processing element receiving parsed packet flows updates the stored packet analysis association based on received parsed packet flows. Additionally features the OSI layer 2-4 associations include a 3-tuple/5-tuple associations, an IPv4/IPv6 associations and/or a TCP/UDP port associations.

The present invention also includes load balancing by each the first analysis tier and the second analysis tier based on a packet processing element having multiple egress ports, wherein load balancing includes using a symmetric 5-tuple folded hash algorithm to selectively choose an egress port based on the hash. Such a process comprises generating a symmetric 5-tuple folded hash for each parsed packet flow such that the symmetric 5-tuple folded hash for two unidirectional flows arrive at the same port at the packet processing element.

The second analysis tier of the present invention, in one embodiment, analyzes flow metrics using a heuristic analysis and, in another embodiment, determines whether a match exists between the packet flow and a 5-tuple stored packet analysis association.

As with the first analysis tier, the second analysis tier updates a 5-tuple database associated with the first analysis tier and, thereafter, examines packet data payloads of the parsed packet flow for an analysis match using analysis techniques selected from the group consisting of key word, byte sequence, and semantic expression.

The method methodology, described above is, in another embodiment, implemented in a system comprised of a first network device and a second network device. The first network device includes a non-transitory storage medium having embodied therein instructions representing one or more modules operable to differentially forward packet flows based on a OSI layer 2-4 match between a stored OSI layer 2-4 association, gained initially from one or more packet processing elements, and the OSI layer 2-4 metadata extracted from a parsed packet flow.

The second network device also includes a non-transitory storage medium having embodied therein instructions this time representing one or more packet inspection engines configured to conduct packet analysis and to differentially forward parsed packet flows received from the first network device to the one or more packet processing elements based on identifying an analysis match between a stored packet analysis association, gained initially from the one or more packet processing elements, and packet analysis results from packet analysis of the received parsed packet. Each of the one or more packet processing elements is configured to update the stored OSI layer 2-4 association based on received parsed packet flows.

In another embodiment, the first network device includes a parsing module configured to receive and parse encapsulated packet flows gaining access to innermost network frame of each parsed packet flow and extracting OSI layer 2-4 metadata.

The stored OSI layer 2-4 association of the first network device includes, instructions directing the parsed packet flow be delivered to one or more packet processing elements, or for additional analysis of the packet flow by one or more packet inspection engines of the second network device.

The stored packet analysis association of the second network device also includes instructions directing the parsed packet flow be delivered to one or more packet processing elements. In addition, the second analysis tier updates stored OSI layer 2-4 associations of the first network device based on analysis matches by the second network device thereby directing future parsed packet flows having OSI layer 2-4 metadata similar to OSI layer 2-4 metadata of analysis matches by the second network device to the one or more packet processing elements by the first network device rather than by the second network device. The second network device can be configured to update the stored OSI layer 2-4 association of the first network device based on matches by the second network device, thereby forwarding future packet flows by the first network device based on the OSI layer 2-4 associations rather than packet analysis association.

In yet another version of the present invention, the first network device and the second network device are each configured to load balance packet flows based on the stored packet analysis association to more than one of the one or more packet processing elements with separate delivery paths, wherein the load balancing includes using a symmetric 5-tuple folded hash algorithm to selectively choose one of the one or more packet processing elements based on the hash. In such an instance the load balancing matches the symmetric 5-tuple folded hash for two unidirectional flows so as to arrive at the same port at the one of the one or more packet processing elements.

Features and advantages described in this disclosure and in the following detailed description are not all-inclusive. Many additional features and advantages will be apparent to one of ordinary skill in the relevant art in view of the drawings, specification, and claims hereof. Moreover, it should be noted that the language used in the specification has been principally selected for readability and instructional purposes and may not have been selected to delineate or circumscribe the inventive subject matter; reference to the claims is necessary to determine such inventive subject matter.

BRIEF DESCRIPTION OF THE DRAWINGS

The aforementioned and other features and objects of the present invention and the manner of attaining them will become more apparent, and the invention itself will be best understood, by reference to the following description of one or more embodiments taken in conjunction with the accompanying drawings, wherein.

Figure 1:
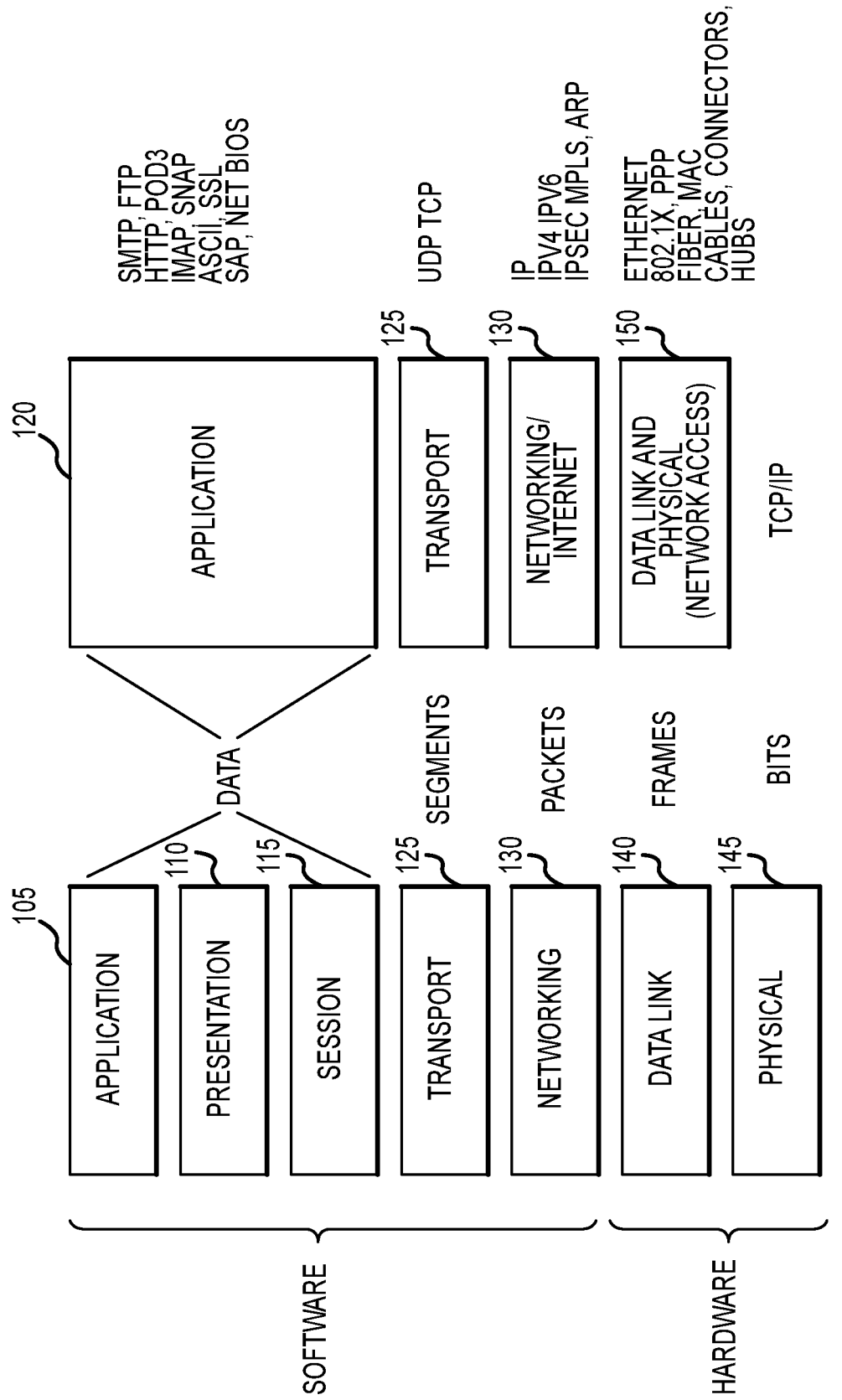
FIG. 1 is a high-level comparison of the OSI and TCP/IP model as applied to one or more embodiments of the present invention.

The Figures depict embodiments of the present invention for purposes of illustration only. Like numbers refer to like elements throughout. In the figures, the sizes of certain lines, layers, components, elements or features may be exaggerated for clarity. One skilled in the art will readily recognize from the following discussion that alternative embodiments of the structures and methods illustrated herein may be employed without departing from the principles of the invention described herein.

DESCRIPTION OF THE INVENTION

A multi-tiered system and associated methodology adaptably directs packet flows to select packet processing elements based first OSI layer 2-4 features and, when necessary, inspection of data payloads. Upon receiving a data stream, the present invention applies a packet-level selection rules to extract packets and direct them to appropriate packet processing elements for additional processing. The invention first parses data flows thereby identifying each data flow's OSI layer 2-4 metadata. A comparison of identified OSI layer 2-4 metadata to a database of OSI layer 2-4 associations ensues. Upon a match being recognized the entirety of the matching packet flow is immediately directed to the packet processing element linked to that OSI layer 2-4 association. When a match of a packet flow's OSI layer 2-4 does not occur, the packet flow is thereafter directed, in one embodiment, to a second analysis tier whereby data payloads of the flow are examined using keyword, expression extraction, semantic analysis and similar techniques. Characteristics from the data payload analysis are compared to entries in a packet analysis database. Upon a match being recognized, the matching packet flow is thereafter directed to the packet processing element linked to that packet analysis entry much like the first analysis tier. OSI layer 2-4 metadata of packet flow having undergone data payload analysis are captured and used to update the database of OSI layer 2-4 associations so that any subsequent receipt of similar packet flows will be immediately forwarded to the linked packet processing element without having to conduct a data payload analysis.

Embodiments of the present invention are hereafter described in detail with reference to the accompanying Figures. Although the invention has been described and illustrated with a certain degree of particularity, it is understood that the present disclosure has been made only by way of example and that numerous changes in the combination and arrangement of parts can be resorted to by those skilled in the art without departing from the spirit and scope of the invention.

The following description with reference to the accompanying drawings is provided to assist in a comprehensive understanding of exemplary embodiments of the present invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. Also, descriptions of well-known functions and constructions are omitted for clarity and conciseness.

The terms and words used in the following description and claims are not limited to the bibliographical meanings, but, are merely used by the inventor to enable a clear and consistent understanding of the invention. Accordingly, it should be apparent to those skilled in the art that the following description of exemplary embodiments of the present invention are provided for illustration purpose only and not for the purpose of limiting the invention as defined by the appended claims and their equivalents.

By the term "substantially" it is meant that the recited characteristic, parameter, or value need not be achieved exactly, but that deviations or variations, including for example, tolerances, measurement error, measurement accuracy limitations and other factors known to those of skill in the art, may occur in amounts that do not preclude the effect the characteristic was intended to provide.

The term "tuple" is meant to group any number of items into a single compound value. Syntactically, a tuple is a comma-separated sequence of values. The IP 5-tuple is a collection of five features (protocol plus source and packet processing element IP addresses and ports) that identify a TCP/IP connection. A tuple is immutable, which means that it's structure and its values cannot change (as opposed to a variable, even if the value doesn't change). An IP 5-tuple is unchanged throughout its journey from the source device to the packet processing element device. This means that it can be tracked as it moves around the system. While the 5-tuple is referenced in the present invention one or reasonable skill in the relevant art will recognize that other numbers of items such a 3-tuple and the like, can be used without departing from the scope of the present invention.

The term "TCP/IP" is meant as the Transmission Control Protocol/Internet Protocol suite of communication protocols used to interconnect network devices on the Internet.

The term "OSI" refers to the Open Systems Interconnection model that conceptual characterizes and standardizes the communication functions of a telecommunication or computing system without regard to its underlying internal structure and technology.

The term "header" is meant as a unit of information that precedes a data object. In a network transmission, a header is part of the data packet and contains transparent information about the file or the transmission. Typically, control information is found in packet headers and trailers.

The term network "segment" is meant a portion of a computer network that is separated from the rest of the network by a device such as a repeater, hub, bridge, switch or router. Each segment can contain one or multiple computers or other hosts The term network "packet" is meant as a formatted unit of data carried by a packet-switched network. A packet consists of control information and user data, which is also known as the payload. Control information provides data for delivering the payload, for example: source and packet processing element network addresses, error detection codes, and sequencing information. Typically, control information is found in packet headers and trailers.

An innermost network frame means the last network frame in a tunneled networking packet.

OSI Layer 2-4 metadata is meant to mean any data that can be extracted from the OSI Layer 2-4 header information contained in a tunneled or non-tunneled network packet.

Packet processing elements are meant to mean separate applications within a network environment that perform analytic processing of a network packet.

Load balancing is meant to mean the distribution of network packets to multiple receiving entities. This ensures no single server bears too much demand. By spreading the work evenly, load balancing improves application responsiveness.

A symmetric 5-tuple folded hash is meant to mean the generation of a hash value of a smaller size than the original IP 5-tuple (destination IP, source IP, IP protocol, TCP/UDP destination port and TCP/UDP source port) by concatenating the individual fields into a single large byte string and then breaking the larger key into hash value sized byte strings and combining the values to generate a hash value such that the ordering of the values within the IP 5-tuple do not affect the returned hash value.

The following terminology used herein is for the purpose of describing particular embodiments only and is not intended to be limiting of the invention. As used herein, the singular forms "a," "an" and "the" are intended to include the plural forms as well, unless the context clearly indicates otherwise. Thus, for example, reference to "a component surface" includes reference to one or more of such surfaces.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the specification and relevant art and should not be interpreted in an idealized or overly formal sense unless expressly so defined herein. Well-known functions or constructions may not be described in detail for brevity and/or clarity.

It will be also understood that when an element is referred to as being "on," "attached" to, "connected" to, "coupled" with, "contacting", "mounted" etc., another element, it can be directly on, attached to, connected to, coupled with or contacting the other element or intervening elements may also be present. In contrast, when an element is referred to as being, for example, "directly on," "directly attached" to, "directly connected" to, "directly coupled" with or "directly contacting" another element, there are no intervening elements present. It will also be appreciated by those of skill in the art that references to a structure or feature that is disposed "adjacent" another feature may have portions that overlap or underlie the adjacent feature.

Spatially relative terms, such as "under," "below," "lower," "over," "upper" and the like, may be used herein for ease of description to describe one element or feature's relationship to another element(s) or feature(s) as illustrated in the figures. It will be understood that the spatially relative terms are intended to encompass different orientations of a device in use or operation in addition to the orientation depicted in the figures. For example, if a device in the figures is inverted, elements described as "under" or "beneath" other elements or features would then be oriented "over" the other elements or features. Thus, the exemplary term "under" can encompass both an orientation of "over" and "under". The device may be otherwise oriented (rotated 90 degrees or at other orientations) and the spatially relative descriptors used herein interpreted accordingly. Similarly, the terms "upwardly," "downwardly," "vertical," "horizontal" and the like are used herein for the purpose of explanation only unless specifically indicated otherwise.

Included in the description are flowcharts depicting examples of the methodology which may be used to direct data flows to select packet processing elements. In the following description, it will be understood that each block of the flowchart illustrations, and combinations of blocks in the flowchart illustrations, can be implemented by computer program instructions. These computer program instructions may be loaded onto a computer or other programmable apparatus to produce a machine such that the instructions that execute on the computer or other programmable apparatus create means for implementing the functions specified in the flowchart block or blocks. These computer program instructions may also be stored in a computer-readable memory that can direct a computer or other programmable apparatus to function in a particular manner such that the instructions stored in the computer-readable memory produce an article of manufacture including instruction means that implement the function specified in the flowchart block or blocks. The computer program instructions may also be loaded onto a computer or other programmable apparatus to cause a series of operational steps to be performed in the computer or on the other programmable apparatus to produce a computer implemented process such that the instructions that execute on the computer or other programmable apparatus provide steps for implementing the functions specified in the flowchart block or blocks.

Accordingly, blocks of the flowchart illustrations support combinations of means for performing the specified functions and combinations of steps for performing the specified functions. It will also be understood that each block of the flowchart illustrations, and combinations of blocks in the flowchart illustrations, can be implemented by special purpose hardware-based computer systems that perform the specified functions or steps, or combinations of special purpose hardware and computer instructions.

Some portions of this specification are presented in terms of algorithms or symbolic representations of operations on data stored as bits or binary digital signals within a machine memory (e.g., a computer memory). These algorithms or symbolic representations are examples of techniques used by those of ordinary skill in the data processing arts to convey the substance of their work to others skilled in the art. As used herein, an "algorithm" is a self-consistent sequence of operations or similar processing leading to a desired result. In this context, algorithms and operations involve the manipulation of information elements. Typically, but not necessarily, such elements may take the form of electrical, magnetic, or optical signals capable of being stored, accessed, transferred, combined, compared, or otherwise manipulated by a machine. It is convenient at times, principally for reasons of common usage, to refer to such signals using words such as "data," "content," "bits," "values," "elements," "symbols," "characters," "terms," "numbers," "numerals," "words", or the like. These specific words, however, are merely convenient labels and are to be associated with appropriate information elements.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

The Internet is a packet switched network. When information is sent across the Internet from one computer (and endpoint) to another computer (endpoint) the data is broken into small packets. Switches, also known as routers, send the packets across the Internet to its endpoint, a packet processing element, individually. When packets arrive at the packet processing element the are recombined into their original form. The Internet Protocol (IP) is tasked with routing the data between point A and point B while the Transmission Control Protocol (TCP) is charged with breaking the data into packets at the sender and reconstituting the data at the packet processing element. Each packet includes a header that contains a variety of information. This information includes, among other things, the order in which the packets should be reassembled with respect to other related packets, information regarding the identity of the send and the data related to the destination.

Each packet includes information that tells the Internet where to send the data as well as information regarding the sender. Much like several envelopes all being mailed to the same location, each with a piece of a puzzle that needs to be put together in a specific order. Each envelope of data may take a different route to the packet processing element and arrive at a different time. Yet for the puzzle to be recognized the data must be reconstructed in a specific order. Thus, the packets flow from one location to another where they are reconstituted to reform the picture/data.

As one of reasonable skill in the relevant art will appreciate there are numerous intermediary steps and conditions that must be meet for packets of data to flow from one location to another. FIG. 1 presents comparison of the Open Systems Interconnection (OSI) model for communication between computing systems with that of the TCP/IP model. The TCP/IP model is, in essences, a concise version of the OSI model having four layers rather than the OSI's seven.

The OSI and TCP/IP models enable diverse communication systems to communicate using standard protocols. In plain English, the OSI provides a standard for different computer systems to be able to communicate with each other. It is based on the concept of splitting up a communication system into seven abstract layers, each one stacked upon the last.

Referring generally to FIG. 1, the application layer 105 is the only layer that directly interacts with data from the user. Software applications like web browsers and email clients rely on the application layer to initiate communications. But client software applications are not part of the application layer 105; rather the application layer 105 is responsible for the protocols and data manipulation that the software relies on to present meaningful data to the user. Application layer protocols include HTTP as well as SMTP (Simple Mail Transfer Protocol is one of the protocols that enables email communications.

The presentation layer 110 is primarily responsible for preparing data so that it can be used by the application layer 105; in other words, this layer makes the data presentable for applications to consume. The presentation layer 110 is responsible for translation, encryption, and compression of data. The session layer 115 laying directly below the presentation layer is responsible for opening and closing communication between the two devices. The time between when the communication is opened and closed is known as a session. The session layer 115 ensures that the session stays open long enough to transfer all the data being exchanged, and then promptly closes the session in order to avoid wasting resources. These three layers of the OSI model (application, presentation, and session) comprise what is referred to as the application layer 120 of the TCP/IP model. The second analysis tier of the present invention engages the data flow at the application layer of the TCP/IP model.

The transport layer 125 in both the OSI and TCP/IP model is responsible for end-to-end communication between the two devices. This includes taking data and breaking it up into chunks called segments before sending it to the network layer. The transport layer 125 on the receiving device is responsible for reassembling the segments into data the session layer can consume.

The network layer 130 (OSI and TCP/IP) is responsible for facilitating data transfer between two different networks. The network layer 130 breaks up the segments from the transport layer into smaller units, called packets, on the sender's device, and reassembling these packets on the receiving device. The network layer 130 finds the best physical path for the data to reach its packet processing element; this is known as routing transmits data segments between networks in the form of packets. For example, consider an email message sent to a friend. This layer assigns source and packet processing element IP addresses to the data segments. The present invention's first analysis tier operates at the transport and networking layer.

The data link layer 140 is very similar to the network layer 130, except the data link layer 140 facilitates data transfer between two devices on the SAME network. The physical layer 145 includes the physical equipment involved in the data transfer, such as the cables and switches. This is also the layer where the data gets converted into a bit stream, which is a string of 1s and 0s. The physical layer of both devices must also agree on a signal convention so that the 1s can be distinguished from the 0s on both devices. The data link 140 and physical layers 145 of the OSI model combine to form the physical layer 150 of the TCP/IP model. These layers are not applicable to the present invention.

Figure 2:
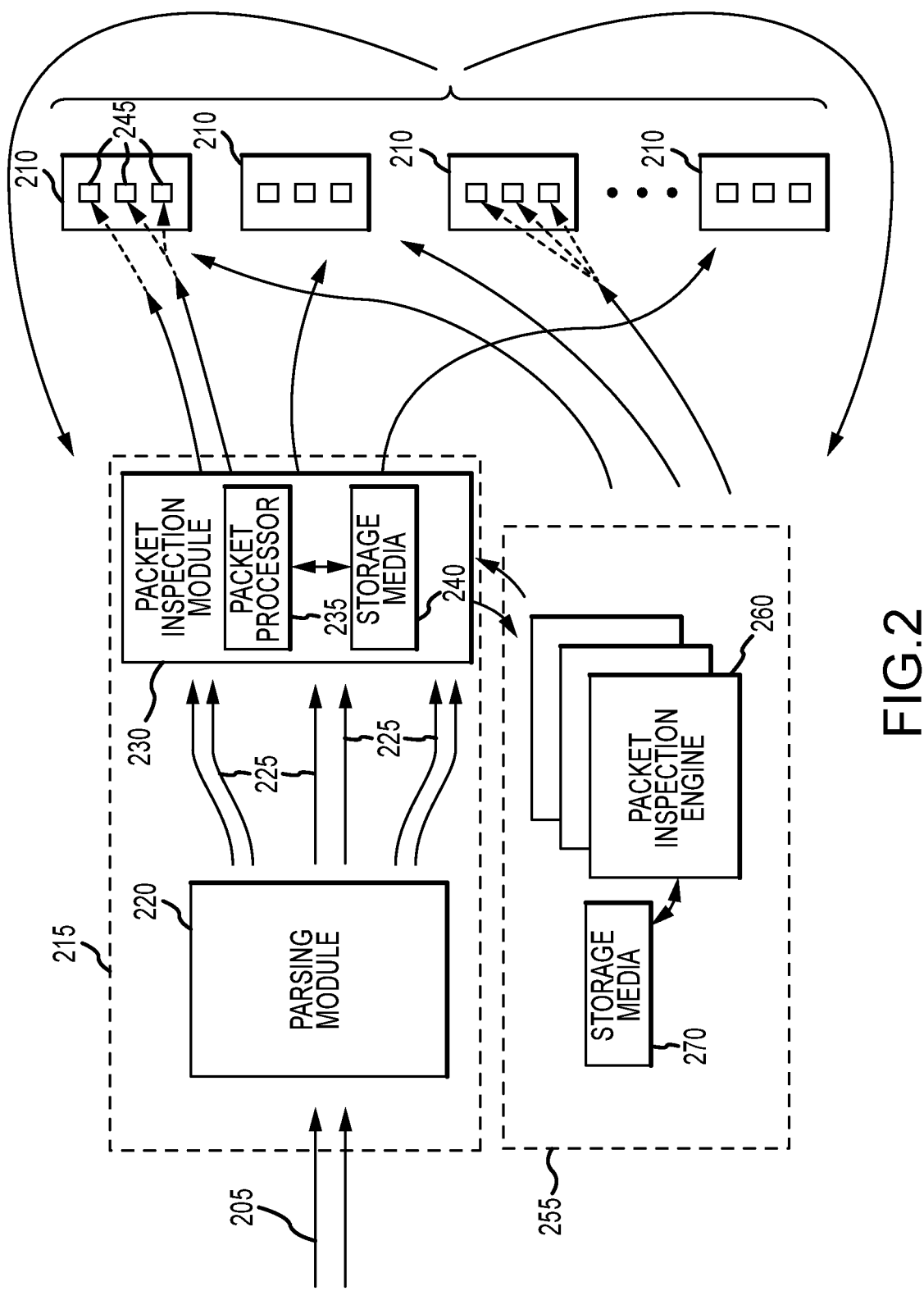
FIG. 2 presents a system architecture schematic of packet flow analysis according to one embodiment of the present invention.

FIG. 2 presents a high-level system architecture for a multi-tiered packet flow analysis system according to one embodiment of the present invention. There are numerous entities that monitor network traffic. Applications examine network traffic for malware, criminal activities, breaches of security, market analysis, political trends, and the like. So much information travels through the Internet that applications to monitor and analyze that data are evolving daily. With the evolution of monitoring applications comes a corresponding need to channel applicable information to the appropriate applications. As one of reasonable skill in the relevant art can appreciation, the resulting analysis of certain types of monitoring tasks are time critical. Consider an application that monitors data flows controlling the switching of commuter trains. A failure or corruption of such a system can have devastating impact necessitating that such data flow is efficiently and effectively channeled to select monitoring applications, also known as packet processing elements 210.

The present invention separates traditional filtering and analysis of packet flows using a multi-tiered architecture to enhance timely delivery to one or more packet processing elements 210. As network traffic 205 arrives at of the first analysis tier 215 (also referred to herein as a first network device) the traffic is parsed by a parsing module 220 to isolate and address any tunneling protocols associated with the packet. Packet flows are frequently encapsulated and by parsing the flow, analysis of, and actions based upon, the packet's innermost IP frame can occur.

Parsed data flows 225 are directed to a packet inspection module 230 wherein one or more packet processors 235 apply packet-level selection rules to quickly extract packets from the data streams. Packet header information gained from a packet's OSI layer 2-4 metadata relevant to the transport and networking layers of the OSI and TCP/IP model are compared to stored OSI layer 2-4 associations. According to one embodiment of the present invention, the packet processors 235 access a storage medium 240 possessing a plurality of database having OSI layer 2-4 associations of interest to select packet processing elements. Packet processing elements 210 provide the first analysis tier with select information pertaining to what packet flows are of interest. For example, an email packet monitoring application/packet processing element 210 may only want email packets while another packet processing element 210 may focus on browser activity. Several databases are configured with a static lists of selection rules for each packet processing element 210 providing the packet processors with desired OSI layer 2-4 associations. The packet processors 235 compare packet OSI layer 2-4 metadata with stored OSI layer 2-4 associations to identify a match. Upon a match occurring, the packet flow is directed to the packet processing element 210, or packet processing elements, associated with the stored association. When the packet processing element contains more than one port 245, the packet inspection module 230 intelligently load-balances traffic to the same packet processing element 210 using a hash.

For example, assume that a packet processing element 210 inspects external email communications. Packets associated with email have specific identifiable features in the header. Using that information, email related packets are funneled to the appropriate packet processing element 210. The OSI layer 2-4 associations, or selection rules, can also isolate particular email flows so that matching flows are sent to the same packet processing element. Continuing with the example above, assume a particular packet processing element may only want emails originating from company A. Company A may have 20000 employees, each with email accounts. To accept this number of packet flows, the application may have several ports on which information may arrive. The present invention load balances the traffic among these ports but moreover ensures that a matching flow is directed to the same port. That is, emails from the same person are directed to the same port and not split up among the other ports available at the packet processing element.

As described above, the present invention quickly directs packet flows to appropriate packet processing elements 210, at the first analysis tier 215, using OSI layer 2-4 information. The packet processors compared identified OSI layer 2-4 metadata to stored OSI layer 2-4 associations provided by the packet processing elements. According to one embodiment of the present invention, the packet processing element 210 dynamically modifies the OSI layer 2-4 information of interest in the associations to further enhance the packet processor's ability to deliver packet flows that are of interest to the packet processing element.

As a packet processing element receives packet flows it may recognize that the provided information and processing thereafter can be optimized. The packet processing element 210 can thereafter dynamically modify the stored OSI layer 2-4 association that the packet processors 235 use to determine whether a packet match occurs. In doing so the packet processing elements 210 refines the matching process thereby improving the quality and applicability of the packet flows that arrive for inspection.

As an illustration and turning back to the prior example, assume the email packet processing elements recognizes that some of the email packet flows of Company A include broadcast emails that are sent out for marketing purposes. This particular packet processing element is not interested in such emails and modifies the stored OSI layer 2-4 associations (selection rule) to exclude header information associated with those packet flows. As a result, the latency of the packet processing element is reduced since it no longer has to analyze and process non-applicable marketing email transmissions.

Analysis and packet flow selection based on OSI layer 2-4 analysis can be quickly accomplished with minimal processor requirements. There are instances, however, in which the OSI layer 2-4 does not provide sufficient information by which to direct the packet flow to the appropriate packet processing element. According to the one embodiment of the present invention, a second analysis tier 255 conducts deep packet inspection to select packet flows using complex examination techniques necessitating additional processing resources.

As shown in FIG. 2, select packet flows are directed to one or more packet inspection engines 260 of the second analysis tier. Each packet inspection engine applies advanced criteria to ascertain the appropriate packet processing element selection. Key word, regular expression matching, and semantic analysis (and the like) are employed by one or more packet inspection engines 260 to identify appropriate packet flows for certain packet processing elements 210. Each packet inspection engine 260 accesses a storage media 270 possessing stored packet analysis association information which it uses to determine if a certain packet flow should be directed to a particular packet processing element 210. Unlike the first analysis tier 215, the packet inspection engines 260 of the second analysis tier 255 operate in the application layers of the TCP/IP model. Using algorithms seeking specific data associations, the packet inspection engine can identify packet flows of a particular interest.

Consider again the email traffic monitoring example presented above. While email related packet flows can be quickly identified using OSI layer 2-4 information, the content of those emails cannot be quickly examined. If a particular monitoring application is not only tasked with monitoring emails from a certain company but, particular emails that use certain key works or discuss a certain topic, additional analysis of the data contained within the packet flow must be considered. Such analysis can be computationally demanding. To maximize throughput of packet flows, a plurality of packet inspection engines can operate simultaneously. Each engine may look at a packet flow using a different technique, comparing its packet analysis with stored packet analysis associations (selection rule). If a match occurs the packet flow is directed to the appropriate packet processing element based on the selection rule.

As with the first analysis tier 215, the second analysis tier 255 is configured with static packet analysis associations. Each packet analysis association links a particular pattern or analysis result with a packet processing element 210. When a match occurs, the association provides the packet inspection engine with information as to which packet processing elements the packet flow should be directed. As packet flows arrive at the packet processing elements 210, the criteria used to select the packet flows, (the packet analysis associations) can be dynamically modified and updated. In doing so each packet inspection engine 260 becomes more efficient in finding packet flows that are of interest for the packet processing elements 210.

Having identified a packet flow of interest the second analysis tier 255 can, in another embodiment of the present invention, modify the matching criteria of the first analysis tier 215 so as to direct future data flows direction to the appropriate packet processing element 210 without having to conduct deep packet inspection. As each packet inspection engine applies data packet analysis techniques to ascertain to which packet processing element the data flow should be directed, information regarding the innermost IP frame of the data flows is collected. Upon identifying a packet flow that matches a stored packet analysis association, the characteristics of that packet flow's OSI layer 2-4 can be added to the stored OSI layer 2-4 associations of the first analysis tier. As new packets arrive at the first analysis tier, packets that would otherwise be directed to the second analysis tier for deep packet analysis can be quickly directed to the appropriate packet processing element, bypassing the second analysis tier entirely. This dynamic interaction between the first analysis tier, the second analysis tier and each packet processing element optimizes data flow throughput while minimizing latency.

Figure 3A:
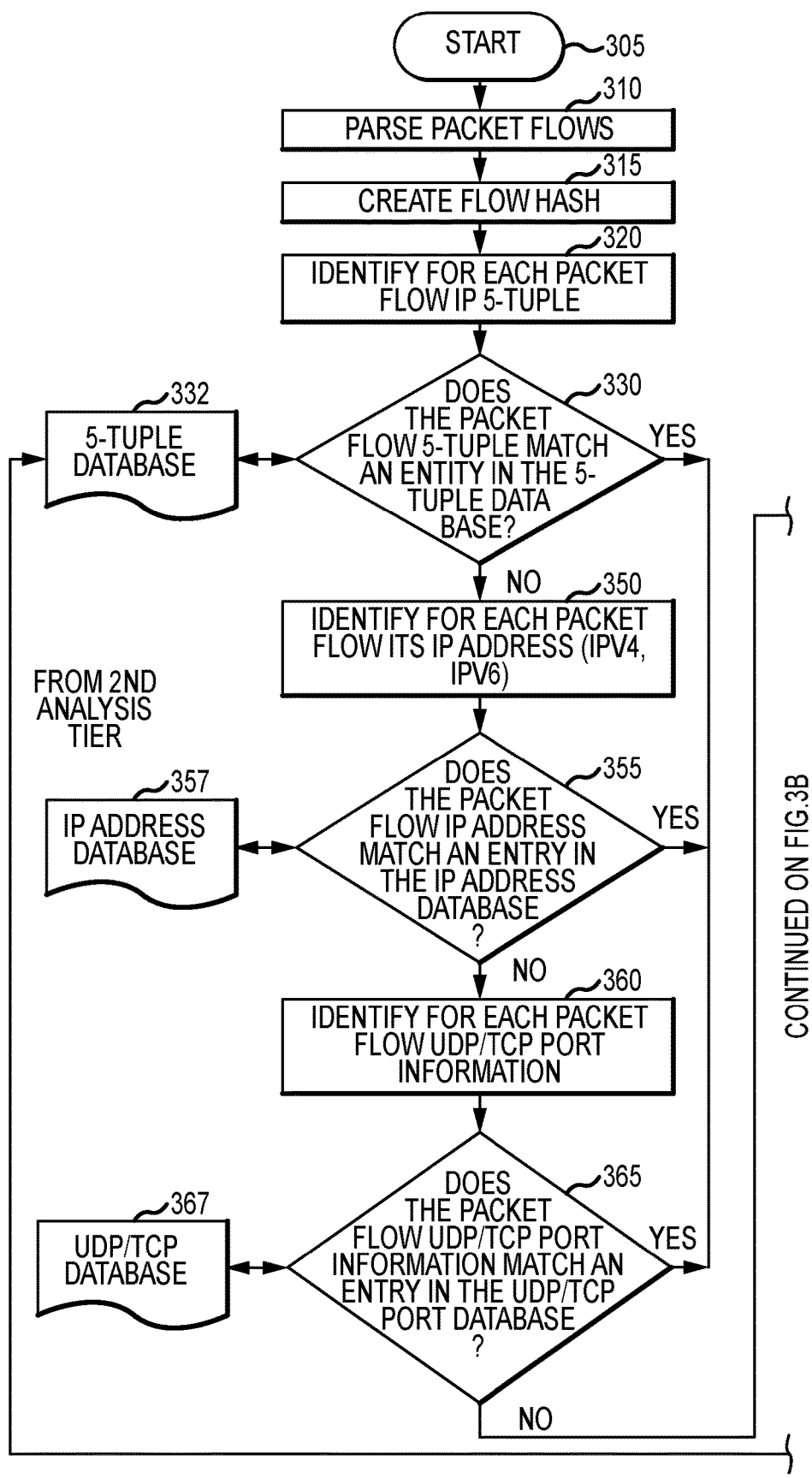
FIGS. 3A and 3B comprise a flowchart depicting a methodology for a first analysis tier according to one embodiment of a multi-tiered methodology for packet flow analysis.
Figure 3B:
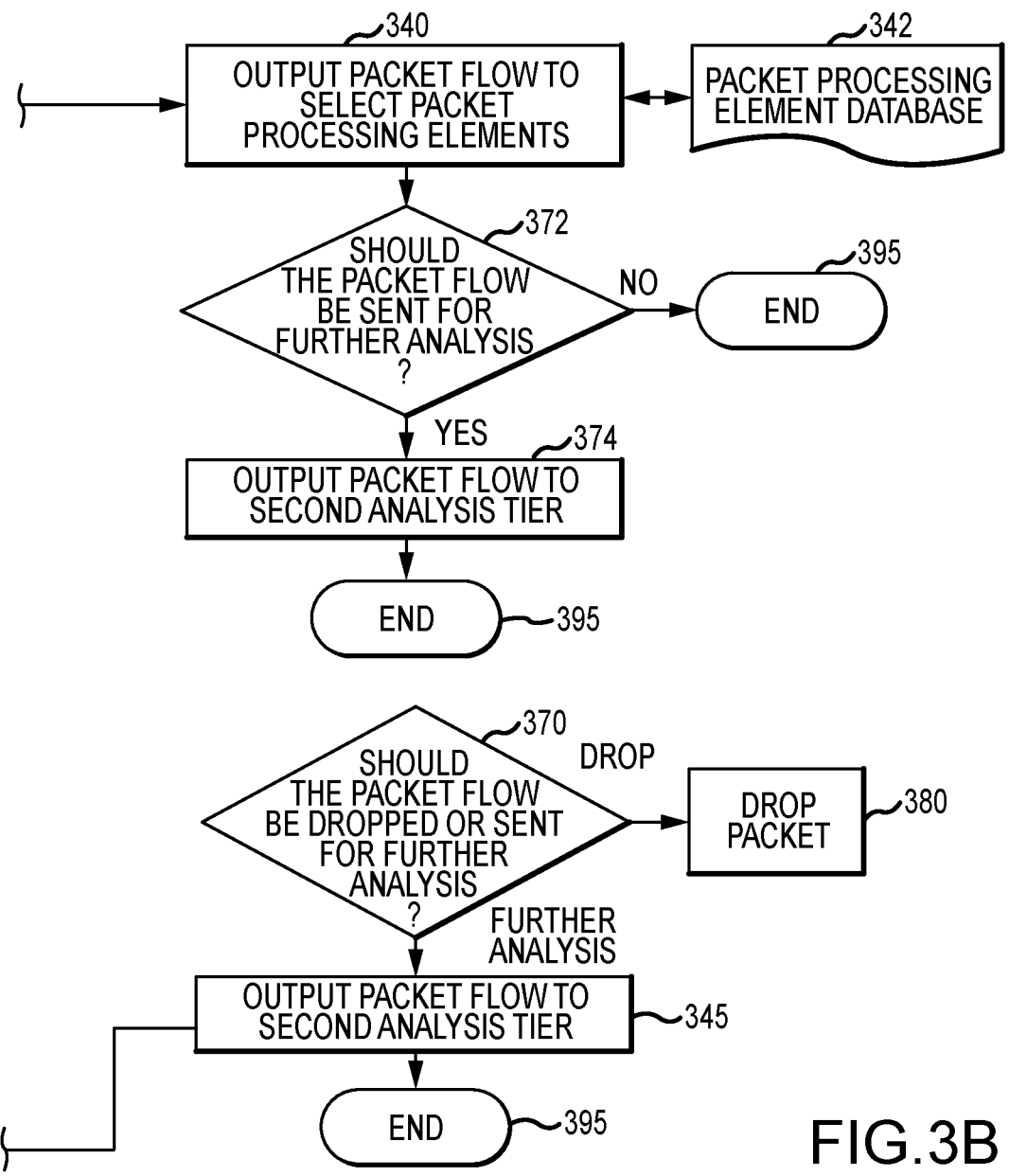
Figure 4:
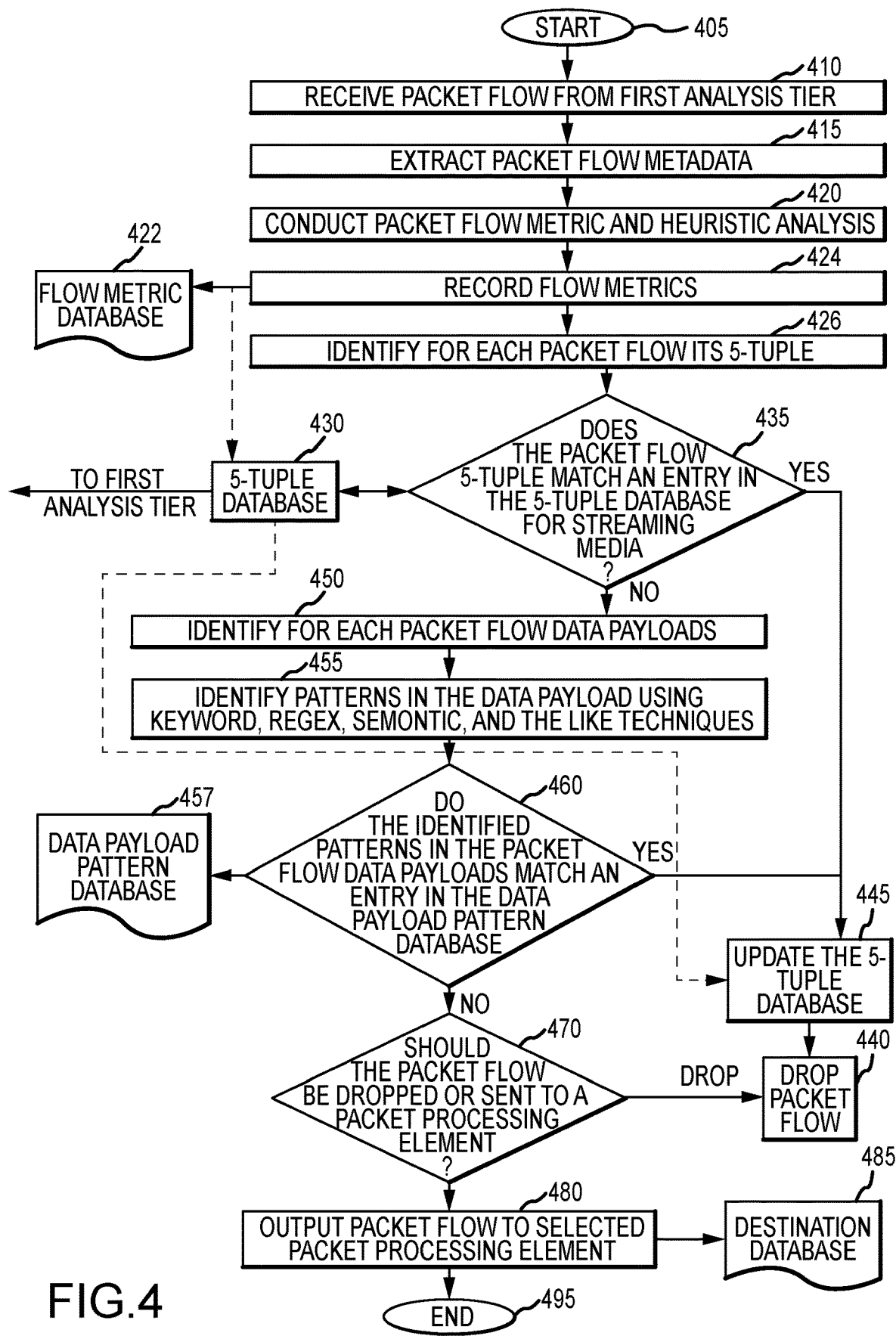
FIG. 4 is a flowchart depicting a methodology for a second analysis tier according to one embodiment of a multi-tiered methodology for packet flow analysis.

A methodology embodiment, by which packet flows are directed to appropriate packet processing elements by the multi-tiered system for packet flow analysis of the present invention, is depicted, collective, in FIGS. 3 and 4. Those with reasonable skill in the relevant arts of networking will recognize that many of the features described hereafter may be implemented using differing techniques. For example, other, or yet to be discovered, packet analysis techniques and packet analysis tools may supplant those techniques described below. These and other techniques and methodologies are contemplated by the present invention and are deemed within the scope of the invention as recited in the claims.

FIGS. 3A and 3B presents a flowchart of one methodology of the present invention for a first analysis tier packet flow examination using OSI layer 2-4 metadata. A first network device embodying the first analysis tier of the multi-tiered packet flow processing invention receives packets flows from a network access point and thereafter determines whether representative features of a packet flow's OSI layer 2-4s match stored OSI layer 2-4s associations provide by various packet processing elements. A plurality of databases stored by the first analysis tier provide the packet inspection module of the first analysis tier with OSI layer 2-4 associations of interest and delivery instructions, should a match be identified.

To begin 305 the process, network traffic packet flows are parsed 310 to construe any tunneling protocols contained in each packet. By doing so subsequent processing steps can be applied to the innermost IP frame of the packets which enables proper packet selection and distribution of network traffic for load-balancing. Once the innermost IP header is found, a flow hash (based on an IP 5-tuple) is generated 315 using a symmetrical folding hash algorithm. This hash enables two paired 5-tuples to be load-balanced to the same packet processing element port at a matching packet processing element.

Once parsed, packet flow OSI layer 2-4 metadata is examined to determine how each packet should be handled. In one embodiment of the present invention, the IP 5-tuple of the packet flow is checked 330 for a matching entry in the applicable OSI layer 2-4 associations database 332 stored on the first analysis tier. The identified IP 5-tuple 320 of the packet flow is checked first because it is a specific characteristic and allows for a network packet flow to be quickly selected. The 5-tuple also ensures that the packet flow is sent to the same packet processing element port as previous packets from the flow. Recall the prior example of email traffic from specific individuals as an example of flow aware packet flow being directed to the same port of a selected packet processing elements. This type of flow aware load balancing ensures data integrity without any packet loss. Entries to the IP 5-tuple database 332 (a subset of the OSI layer 2-4 associations) are first added by external entities such as the packet processing elements configuring a static version of the database. As packet flows are directed to the packet processing elements 340 and to the second analysis tier 345, feedback from the packet inspection engines of the second analysis tier and the applicable packet processing elements modify the 5-tuple database 332 so as to select or deselect a specific network flow for second analysis tier or follow-on analysis by a packet processing element. This step allows for early selection of traffic and reduces computational requirements on the rest of the system.

Next, IP addresses (IPv4/IPv6 and the like) for each packet flow are identified 350 and checked 355 for a match in IP address database 357 (also a subset of the OSI layer 2-4 associations). Upon a match being found the packet flow is directed to an appropriate packet processing element 340 based on associated selection rules of the packet processing element database 342. For purposes of the present invention a packet processing element may be a packet processing element or the second analysis tier. Each packet processing element defines which port or ports packets should be sent out of as well as any packet encapsulation that should be added to the packet. If a packet processing element (application) contains more than one port, then the first analysis tier will adjust traffic among the ports to intelligently provide flow-aware load-balancing. The load-balancing algorithms ensure that matching network flows are sent to the same packet processing element. This is accomplished by using a symmetric folded hash of the IP 5-tuple such that the matching 5-tuples for the two unidirectional flows will generate the same load-balance hash.

Packet flow headers are also examined to identify TCP/UDP information 360. As with IP addresses and 5-IP tuples, the gathered information is compared 365 to data resident in the appropriate OSI layer 2-4 association database 367. If a match is found no further processing on that packet is performed. The selection rules directing where the packet flow should be delivered are applied and the packet flow is sent 340 to the select output packet processing element (packet processing element or second analysis tier) processing. If no rules match, a globally configured default packet process action is used to determine 370 whether the packet should be dropped or output for further processing. It should be noted that an OSI layer 2-4 association match selection rule may direct a packet flow for additional analysis 372 by the second analysis tier 345. Alternatively, the selection rule may direct that the packet flow be dropped 380 in its entirety. In doing so the present invention manages and directs packet flow analysis to only those packet flows of interest, ending 395 the process.

The present invention applies packet-level selection rules (IP address, TCP/UDP port, 5-tuple, etc.) to quickly extract packets from a data stream that should be sent to packet processing elements for additional processing. This early packet selection reduces latency and lessens the amount of data that has to be processed by the second processing tier. Packets that match a selection rule are sent to the packet processing element defined in the matching/selection rule.

With attention turned now to FIG. 4, one embodiment of a methodology for deep packet inspection by a second analysis tier of the multi-tiered system for packet processing can be seen. The second tier of the multi-tiered system of the present invention separates computationally demanding tasks apart from those that can be quickly accomplished by the first analysis tier. While the first analysis tier identifies and directs packet flows based on a packet's OSI layer 2-4 metadata, the second analysis tier, resident in a second network device, delivers packet flows to the appropriate packet processing elements upon packet data analysis.

The packet inspection engines of the second analysis tier apply advanced selection rules, such as application signatures, keyword/RegEx, byte searching, heuristic packet analysis and the like to direct packet flows to the appropriate packet processing element. As packets arrive from the first analysis tier of the present invention they may be encapsulated with packet metadata such as offset to the innermost network frame, etc., or sent, in another embodiment, as raw data (unmodified) for analysis. Data found in application layer of the TCP/IP model (layers 1-3 of the OSI model) are examined to determine whether they match stored (data) packet analysis associations provided by one or more packet processing elements. Upon recognizing a match, packet flow is directed to the appropriate packet processing element as indicated in a selection rule.

Deep packet flow analysis begins 405 with packet ingestion from the first analysis tier 410. According to one embodiment of the present invention, a packet is encapsulated by the first analysis tier and includes metadata about the packet flow such as an offset to the innermost network frame. Providing such information decreases computational demands of the tasked packet inspection engines as the tunneling protocols of the packet do not have to be reprocessed. Accordingly, the packet inspection engine(s) can extract 415 the provided the metadata and begin processing the inner IP frame immediately. According to another embodiment the second analysis tier can receive a raw network packet flow much like the first analysis tier. In this case, the packet inspection engine must perform the same de-tunnel process described above with respect to the first analysis tier.

As packets arrive 410 at the second analysis tier the tasked packet inspection engine(s) gathering metrics 424 about the network flow to which the packet belongs. Such information issued to establish NetFlow or IPFIX statistics regarding the flow and to enable heuristic analysis 420 on the flow. Heuristic analysis finds anomalous data flows in a network and aides in identifying streaming media flows. Streaming media flows are typically very high bandwidth. As such, if they can be identified, they can, in one embodiment, be discarded 440 reducing the overall computation power required to monitor a given network. When such a flow is identified, a 5-tuple flow rule is added 445 to both the first and second analysis databases to discard the flow. Regardless of whether anomalous data flows or streaming media flows are identified, characteristics (metrics) of the data flow being ingested to the second analysis tier is recorded.

Accordingly, after flow metrics are recorded in a flow metric database 442, a 5-tuple database 430 is checked to determine whether the packet flow 5-tuple, identified earlier 426, matches 435 those contained within the 5-tuple database 430. By using the same process as used in the first analysis tier the multi-tiered packet flow processing system can capture the entire stream of packets once a match is found.

When a packet flow has not previously matched a 5-tuple packet analysis association in the second analysis tier then the packets of a packet flow reach a data payload matching phase. Using one or more packet inspection engines the data payload of each packet of a designated packet flow is examined using RegEx (Regular Expression), keyword matching, semantic searching and the like. One of reasonable skill in the relevant art will recognize that numerous data analysis methodologies exist. Each can be, and are contemplated to be, used in conjunction with the present invention. The data payloads of the packets are first identified 450 and then examined 455 to see if they match a defined keyword, byte sequence or regular expression. This type of search may detect malicious traffic on networks but is computationally expensive. One embodiment of the present invention uses hardware-assisted pattern matching to search packets for matching data 457. When a match 460 is found, the packet will be marked for the appropriate action (pass to a packet processing element 480 or drop 440) 470. In addition, a 5-tuple entry will be added to the first and second analysis tier 5-tuple databases. Adding a 5-tuple entry 445 ensures that the remaining packets in the network flow will all have the appropriate action assigned without having to conduct a similar inspection. These entries are enabled from the stored flow metrics gained as the packet flow enters the second analysis tier. With the databases updated, as packet flows enter either the first (or second analysis tier), computationally demanding data analysis techniques are not required, and the packet flow is immediately directed to the appropriate packet processing element.

As with the first analysis tier, when the identified packet processing element from a destination database 485 contains multiple output ports, then a load-balancing hash algorithm is used to determine which port should be used for output. And with the first analysis tier, the packet processing element(s) receiving the packet flow can modify the packet analysis associations used by the second analysis tier to identify matches.

The prior email monitoring example illustrates how the second analysis tier, packet processing elements, and the first analysis tier iteratively and interactively update their matching criteria to maximize throughput while minimizing latency. Recall in this example that network traffic arriving at the first analysis tier was parsed to identify external email packet flows originating from a particular company. By analyzing OSI layer 2-4 metadata of the packet flows, network traffic was easily assigned to a particular packet processing element. However, the packet processing element may determine that only emails having certain key words, or expressions (or the like) are of interest. Such information cannot be found in the header and requires analysis the data payload.

The packet flow is accordingly directed to the second analysis tier for deep packet inspection. Metrics with respect to the data flow are recorded before one or more packet inspection engines examine each packet flow for certain expressions or key words. For example, perhaps the monitoring tool is searching for emails discussing a particular event. As packet flows with these key words or expressions are identified, the packet processing element refines the data analysis association criteria used for a match and second analysis tier updates each respective 5-tuple database. Characteristics (header information) of the emails (data flows) which possess the key words and expressions become recognized. As new data flows (emails) enter the first analysis tier, these data flows now match a 5-tuple entry in the database and are immediately directed to the packet processing element, bypassing further data payload inspection. The present invention iteratively refines the packet flow filtering process to provide maximum throughput with minimal computational demands.

The present invention provides Application Programming Interfaces (API) that follow-on packet processing elements can use to add selection rules to either the first analysis tier and/or the second analysis tier giving the application the ability to detect and select additional flows needed for proper operation. The ability for a follow-on packet processing element to dynamically update system tasking allows applications to enable and disable network traffic depending on the application requirements. In one example, a packet processing element need only the first 1 KB of data in a flow before update the first analysis tier tasking to discard the remainder of the flow.

Figure 5:
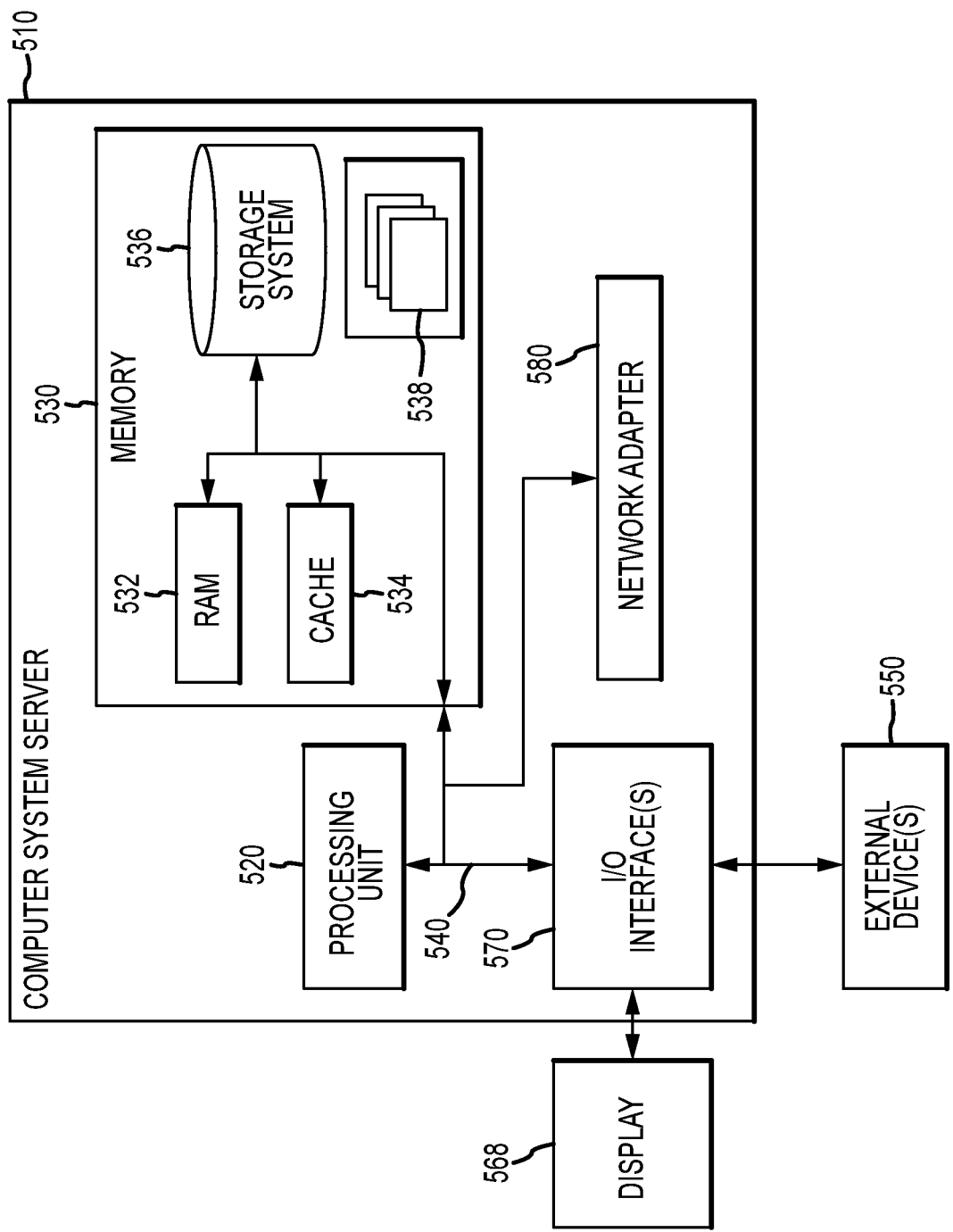
FIG. 5 is a high-level diagram of a computing device suitable for implementation of one or more embodiments of the present invention.

As shown in FIG. 5, a computer system/server 510 in network computing system is shown in the form of a general-purpose computing device. Such computing systems are representative of network devices used in the first and second analysis tier by the packet inspection module and the packet analysis engines, respectively. The components of computer system/server may include, but are not limited to, one or more processors 520 or processing units, a system memory 530, and a bus 540 that couples various system components including system memory to processor.

The bus 540 shown represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 510 typically includes a variety of computer system readable media. Such media may be any available media that is accessible by computer system/server, and it includes both volatile and non-volatile media, removable and non-removable media. System memory 530 can include computer system readable media in the form of volatile memory, such as random-access memory (RAM) 532 and/or cache memory 534. Computer system/server may further include other removable/non-removable, volatile/non-volatile computer system storage media 538. By way of example only, a storage system 536 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus by one or more data media interfaces. As will be further depicted and described below, memory may include at least one program product having a set (e.g., at least one) of program modules that are configured to carry out the functions of embodiments of the disclosure.

Program/utility, having a set (at least one) of program modules, may be stored in memory by way of example, and not limitation, as well as an operating system, one or more application programs, other program modules, and program data. Each of the operating system, one or more application programs, other program modules, and program data or some combination thereof, may include an implementation of a networking environment. Program modules generally carry out the functions and/or methodologies of embodiments of the disclosure as described herein.

Computer system/server 510 may also communicate with one or more external devices 550 such as a keyboard, a pointing device, a display 560, etc.; one or more devices that enable a user to interact with computer system/server; and/or any devices (e.g., network card, modem, etc.) that enable computer system/server to communicate with one or more other computing devices. Such communication can occur via Input/Output (I/O) interfaces 570. Still yet, computer system/server can communicate with one or more networks such as a local area network (LAN), a general wide area network (WAN), and/or a public network (e.g., the Internet) via network adapter 580. As depicted, network adapter communicates with the other components of computer system/server via bus. It should be under-stood that although not shown, other hardware and/or soft-ware components could be used in conjunction with computer system/server. Examples, include, but are not limited to: microcode, device drivers, redundant processing units, external disk drive arrays, RAID systems, tape drives, and data archival storage systems, etc.

It will also be understood by those familiar with the art, that the invention may be embodied in other specific forms without departing from the spirit or essential characteristics thereof. Likewise, the particular naming and division of the modules, managers, functions, systems, engines, layers, features, attributes, methodologies, and other aspects are not mandatory or significant, and the mechanisms that implement the invention or its features may have different names, divisions, and/or formats. Furthermore, as will be apparent to one of ordinary skill in the relevant art, the modules, managers, functions, systems, engines, layers, features, attributes, methodologies, and other aspects of the invention can be implemented as software, hardware, firmware, or any combination of the three.

Wherever a component of the present invention is implemented as software, the component can be implemented as a script, as a standalone program, as part of a larger program, as a plurality of separate scripts and/or programs, as a statically or dynamically linked library, as a kernel loadable module, as a device driver, and/or in every and any other way known now or in the future to those of skill in the art of computer programming. Additionally, the present invention is in no way limited to implementation in any specific programming language, or for any specific operating system or environment. Accordingly, the disclosure of the present invention is intended to be illustrative, but not limiting, of the scope of the invention.

Software programming code which embodies the present invention is typically accessed by a microprocessor from long-term, persistent storage media of some type, such as a flash drive or hard drive. The software programming code may be embodied on any of a variety of known media for use with a data processing system, such as a diskette, hard drive, CD-ROM, or the like. The code may be distributed on such media or may be distributed from the memory or storage of one computer system over a network of some type to other computer systems for use by such other systems. Alternatively, the programming code may be embodied in the memory of the device and accessed by a microprocessor using an internal bus. The techniques and methods for embodying software programming code in memory, on physical media, and/or distributing software code via networks are well known and will not be further discussed herein.

Generally, program modules include routines, programs, objects, components, data structures and the like that perform particular tasks or implement particular abstract data types. The invention may also be practiced in distributed computing environments where tasks are performed by remote processing devices that are linked through a communications network. In a distributed computing environment, program modules may be located in both local and remote memory storage devices.

Embodiments of the present invention as have been herein described may be implemented with reference to various wireless networks and their associated communication devices. Networks can also include mainframe computers or servers, such as a gateway computer or application server (which may access a data repository). A gateway computer serves as a point of entry into each network. The gateway may be coupled to another network by means of a communications link. The gateway may also be directly coupled to one or more devices using a communications link. Further, the gateway may be indirectly coupled to one or more devices. The gateway computer may also be coupled to a storage device such as data repository.

While there have been described above the principles of the present invention in conjunction with a multi-tiered system for packet flow analysis, it is to be clearly understood that the foregoing description is made only by way of example and not as a limitation to the scope of the invention. Particularly, it is recognized that the teachings of the foregoing disclosure will suggest other modifications to those persons skilled in the relevant art. Such modifications may involve other features that are already known per se and which may be used instead of or in addition to features already described herein. Although claims have been formulated in this application to particular combinations of features, it should be understood that the scope of the disclosure herein also includes any novel feature or any novel combination of features disclosed either explicitly or implicitly or any generalization or modification thereof which would be apparent to persons skilled in the relevant art, whether or not such relates to the same invention as presently claimed in any claim and whether or not it mitigates any or all of the same technical problems as confronted by the present invention. The Applicant hereby reserves the right to formulate new claims to such features and/or combinations of such features during the prosecution of the present application or of any further application derived therefrom.

The invention claimed is:

1. A multi-tiered method for packet flow processing, comprising:
 receiving by a parsing module one or more encapsulated packet flows at a first analysis tier;
 parsing each of the one or more encapsulated packet flows gaining access to an innermost network frame of each parsed packet flow wherein parsing includes extracting Open Systems Interconnection (OSI) layer 2-4 metadata;
 responsive to identifying by a packet processor a OSI layer 2-4 match between a stored OSI layer 2-4 association, gained initially from one or more packet processing elements, and the OSI layer 2-4 metadata of a parsed packet flow, directing the parsed packet flow according to the stored OSI layer 2-4 association;
 responsive to the stored OSI layer 2-4 association directing packet analysis, delivering the parsed packet flow to one or more packet inspection engines of a second analysis tier, wherein the second analysis tier updates stored OSI layer 2-4 associations of the first analysis tier based on analysis matches by the second analysis tier thereby directing future parsed packet flows having OSI layer 2-4 metadata similar to OSI layer 2-4 metadata of analysis matches by the second analysis tier to the one or more packet processing elements by the first analysis tier rather than by the second analysis tier; and
 responsive to identifying by one of the one or more packet inspection engines an analysis match between a stored packet analysis association, gained initially from the one or more packet processing elements, and packet analysis results of the parsed packet flow from packet analysis of the parsed packet flow by the one or more packet inspection engines, directing the parsed packet flow according to the stored packet analysis association.

2. The multi-tiered method for packet flow processing according to claim 1, wherein each of the one or more packet processing elements updates the stored OSI layer 2-4 association based on received parsed packet flows.

3. The multi-tiered method for packet flow processing according to claim 1, wherein the stored OSI layer 2-4 association includes instructions directing the parsed packet flow be delivered to one or more packet processing elements.

4. The multi-tiered method for packet flow processing according to claim 1, wherein the wherein the stored OSI layer 2-4 association can include instructions directing the parsed packet flow be discarded.

5. The multi-tiered method for packet flow processing according to claim 1, wherein the stored OSI layer 2-4 association includes instructions directing the parsed packet flow be delivered to the second analysis tier for further processing.

6. The multi-tiered method for packet flow processing according to claim 1, wherein the second analysis tier updates the stored OSI layer 2-4 associations based on packet analysis.

7. The multi-tiered method for packet flow processing according to claim 1, responsive to failing to identify an OSI layer 2-4 match between stored OSI layer 2-4 association and the OSI layer 2-4 metadata of the parsed packet flow configuring the first analysis to output the parsed packet flow to the second analysis tier or discard the parsed packet flow.

8. The multi-tiered method for packet flow processing according to claim 1, wherein an offset to the innermost network frame of the parsed packet flow is passed to the second analysis tier from the first analysis tier.

9. The multi-tiered method for packet flow processing according to claim 1, wherein the stored packet analysis association includes instructions directing the parsed packet flow be delivered to one or more packet processing elements.

10. The multi-tiered method for packet flow processing according to claim 1, wherein the stored packet analysis association can include instructions directing the parsed packet flow be discarded.

11. The multi-tiered method for packet flow processing according to claim 1, responsive to failing to identify an analysis match between stored packet analysis associations and the packet analysis results of the parsed packet flow configuring the second analysis tier to discard the parsed packet flow.

12. The multi-tiered method for packet flow processing according to claim 1, wherein the packet processing element receiving parsed packet flows updates the stored packet analysis association based on received parsed packet flows.

13. The multi-tiered method for packet flow processing according to claim 1, wherein OSI layer 2-4 associations include a 3-tuple/5-tuple associations.

14. The multi-tiered method for packet flow processing according to claim 1, wherein OSI layer 2-4 associations include an IPv4/IPv6 associations.

15. The multi-tiered method for packet flow processing according to claim 1, wherein OSI layer 2-4 associations include a TCP/UDP port associations.

16. The multi-tiered method for packet flow processing according to claim 1, further comprising load balancing by each the first analysis tier and the second analysis tier based on a packet processing element having multiple egress ports and wherein load balancing includes using a symmetric 5-tuple folded hash algorithm to selectively choose an egress port based on the hash.

17. The multi-tiered method for packet flow processing according to claim 16, further comprising generating a symmetric 5-tuple folded hash for each parsed packet flow.

18. The multi-tiered method for packet flow processing according to claim 17, wherein load balancing matches the symmetric 5-tuple folded hash for two unidirectional flows so as to arrive at the same port at the packet processing element.

19. The multi-tiered method for packet flow processing according to claim 1, wherein the second analysis tier analyzes flow metrics using a heuristic analysis.

20. The multi-tiered method for packet flow processing according to claim 19, wherein the second analysis tier determines whether a match exists with the packet flow and a 5-tuple stored packet analysis association.

21. The multi-tiered method for packet flow processing according to claim 20, wherein the second analysis tier updates a 5-tuple database associated with the first analysis tier.

22. The multi-tiered method for packet flow processing according to claim 1, wherein the second analysis tier examines packet data payloads of the parsed packet flow for an analysis match using analysis techniques selected from the group consisting of key word, byte sequence, and semantic expression.

23. The multi-tiered method for packet flow processing according to claim 1, wherein parsing includes techniques selected from the group consisting of MPLS, GRE and IP-in-IP.

24. A multi-tiered system for packet flow processing, comprising:
  a first network device having a non-transitory storage medium having embodied therein instructions representing one or more modules operable to differentially forward packet flows based on a OSI layer 2-4 match between a stored OSI layer 2-4 association, gained initially from one or more packet processing elements, and the OSI layer 2-4 metadata extracted from a parsed packet flow; and
  a second network device communicatively coupled to the first network device, having a non-transitory storage medium having embodied therein instructions representing one or more packet inspection engines configured to conduct packet analysis and to differentially forward parsed packet flows received from the first network device to the one or more packet processing elements based on identifying an analysis match between a stored packet analysis association, gained initially from the one or more packet processing elements, and packet analysis results from packet analysis of the received parsed packet, wherein the second network device is configured to update the stored OSI layer 2-4 association of the first network device based on matches by the second network device thereby forwarding future packet flows by the first network device based on the OSI layer 2-4 associations rather than packet analysis association.

25. The multi-tiered system for packet flow processing according to claim 24, wherein each of the one or more packet processing elements is configured to update the stored OSI layer 2-4 association based on received parsed packet flows.

26. The multi-tiered system for packet flow processing according to claim 24, wherein the first network device includes a parsing module configured to receive and parse encapsulated packet flows gaining access to innermost network frame of each parsed packet flow and extracting OSI layer 2-4 metadata.

27. The multi-tiered system for packet flow processing according to claim 26, wherein the second analysis tier updates stored OSI layer 2-4 associations of the first network device based on analysis matches by the second network device thereby directing future parsed packet flows having OSI layer 2-4 metadata similar to OSI layer 2-4 metadata of analysis matches by the second network device to the one or more packet processing elements by the first network device rather than by the second network device.

28. The multi-tiered system for packet flow processing according to claim 24, wherein the stored OSI layer 2-4 association includes instructions directing the parsed packet flow be delivered to one or more packet processing elements.

29. The multi-tiered system for packet flow processing according to claim 28, wherein the stored OSI layer 2-4 association directs additional analysis of the packet flow by one or more packet inspection engines of the second network device.

30. The multi-tiered system for packet flow processing according to claim 24, wherein the stored packet analysis association includes instructions directing the parsed packet flow be delivered to one or more packet processing elements.

31. The multi-tiered system for packet flow processing according to claim 24, wherein the first network device and the second network device are each configured to load balance packet flows based on the stored packet analysis association to more than one of the one or more packet processing elements with separate delivery paths and wherein load balancing includes using a symmetric 5-tuple folded hash algorithm to selectively choose one of the one or more packet processing elements based on the hash.

32. The multi-tiered system for packet flow processing according to claim 31, wherein load balancing matches the symmetric 5-tuple folded hash for two unidirectional flows so as to arrive at the same port at the one of the one or more packet processing elements.

* * * * *